United States Patent
Huang

(10) Patent No.: US 7,466,265 B1
(45) Date of Patent: Dec. 16, 2008

(54) GPS RECEIVER WITH EXTENDED HOT START CAPABILITY

(75) Inventor: Yi-Ping Huang, Hsinchu (TW)

(73) Assignee: Skytraq Technology Inc., Hsinchu (TW)

( * ) Notice: Subject to any disclaimer, the term of this patent is extended or adjusted under 35 U.S.C. 154(b) by 0 days.

(21) Appl. No.: 11/973,782

(22) Filed: Oct. 10, 2007

(51) Int. Cl.
*G01S 5/14* (2006.01)

(52) U.S. Cl. .................................. 342/357.12
(58) Field of Classification Search ............. 342/357.12
See application file for complete search history.

(56) References Cited

U.S. PATENT DOCUMENTS

| | | | |
|---|---|---|---|
| 5,504,684 A * | 4/1996 | Lau et al. ................... | 455/3.02 |
| 7,091,904 B2 * | 8/2006 | Vantalon et al. ........ | 342/357.03 |
| 7,151,485 B2 * | 12/2006 | Orler et al. ............. | 342/357.06 |
| 7,212,156 B2 * | 5/2007 | Bloebaum et al. ...... | 342/357.12 |
| 2007/0268180 A1 * | 11/2007 | Zhi et al. ............... | 342/357.12 |

OTHER PUBLICATIONS

ATMEL GPS Baseband Processor ATR0622, Product Datasheet, Jan. 2006, pp. 1-26.*
ATMEL ANTARIS Single Chip GPS Receiver ATR0630, Product Datasheet, Mar. 2007, pp. 1-37.*
ATMEL GPS Front-end IC ATR0601, Product Datasheet, Nov. 2006, pp. 1-18.*

* cited by examiner

*Primary Examiner*—Gregory C Issing
(74) *Attorney, Agent, or Firm*—C. G. Mersereau; Nikolai & Mersereau, P.A.

(57) ABSTRACT

A global positioning system (GPS) receiver with extended 1-second hot start capability has an RF chip, a baseband chip, a battery and a LDO regulator. When the GPS receiver is turned on, a main supply voltage charges the battery to store backup power. Once the main supply voltage is turned off, the baseband starts a countdown period. During the countdown period, critical portion of the RF chip, the baseband chip and the regulator use the backup power to continue keeping time. If the GPS receiver is restarted during the countdown period, the GPS receiver has retained information to allow 1-second hot start and the GPS receiver generates position fix instantaneously.

6 Claims, 2 Drawing Sheets

GPS RECEIVER WITH EXTENDED HOT START CAPABILITY

BACKGROUND OF THE INVENTION

1. Field of the Invention

The invention relates to a global positioning system (GPS) receiver with extended hot start capability. In particular, the GPS receiver is capable of being restarted in 1-second hot-start mode with an extended power-off period.

2. Description of Related Art

A Global position system (GPS) consists of 28 satellites that circumnavigate along six orbital planes. Each GPS satellite transmits a pseudorandom code modulated signal with a chip rate of 1.023 MHz at a carrier frequency of 1574.42 MHz.

A GPS receiver comprises a high precision clock circuit driven by a high precision clock reference, which also drives GPS correlator circuitry comprising of multiple correlators. When transmission time of satellite signals are measured from more than four correlator channels, each correlator channel tracking different satellites signals, position of the GPS receiver and time offset of the precision clock can be derived. Once the time offset is derived, the high precision clock circuit is synchronized to match an atomic clock synchronized GPS clock, having accuracy within several tens of a nanosecond.

When powering up a GPS receiver, it goes through the process of signal acquisition, signal tracking, data bit synchronization and frame synchronization to extract desired GPS data for position fix. The GPS data is organized into 5 sub-frames, with each sub-frame spanning 6 seconds. Ephemeris data for calculating satellite position is within sub-frames 1-3. Every four hours, new ephemeris data is uploaded to the satellites and these new data need to be downloaded to calculate the satellite position.

When turning on a GPS receiver that has been powered off for several hours, a waiting time is required to download the ephemeris data and it takes about 18 to 30 seconds; the GPS receiver cannot generate the position during this data decoding time.

GPS receivers typically are implemented capable of supporting hot-start, this applies when a GPS receiver has been restarted and has not been powered off for more than an hour. Battery-sustained, internally held ephemeris data is still valid and the position can be calculated without needing to download new ephemeris data, thereby eliminating the waiting time of 18 to 30 seconds. Only couple seconds of acquiring signal, tracking signal, perform data and frame synchronization is needed to generate position fix.

With reference to FIG. 2, the partial circuit of a conventional GPS receiver comprises a radio frequency (RF) chip (70), a baseband chip (50) and a rechargeable backup battery (60). After the GPS signal is received and processed with a series of RF front-end procedures such as signal amplification, noise filtering, and frequency translation and sampling, the processed signal is output to the baseband chip (50) for further processing to generate position velocity and time information.

The baseband chip (50) comprises a real time clock unit (51), a timing control unit (52), a correlator unit (53), a processor unit (54), a memory (55) and a general-purpose input/output (GPIO) unit (56). The real time clock unit (51) is integrated with a backup static random access memory (SRAM) and uses a crystal oscillator to generate a real time clock signal.

The RF chip (70) and the baseband chip (50) each receive an individual operating voltage (VCCA) (VCC1) from a main supply voltage. The main supply voltage is further used to charge the backup battery (60). However, the real time clock unit (51) of the baseband chip (50) is powered by another operating voltage (VCC2), supplied by the backup battery (60) when the main supply voltage is removed, and does not share the operating voltage (VCC1) as other elements of the baseband chip (50).

Therefore, after the GPS receiver is powered off, the real time clock unit (51) can continue working and the ephemeris data stored in the backup SRAM are retained for use when the GPS receiver is restarted while the battery lasts. The 1-second hot start mode requires that the drift of the real time clock be within 0.5 milliseconds, and time accurate to millisecond can be correctly estimated without needing to go through data bit and frame synchronization to extract precise time information. As a result, the GPS receiver can immediately achieve position fix upon locking onto at least 4 GPS satellite signals.

The precision of the crystal oscillator for the real time clock (51) is typically in a large range of +/−25 ppm. In a worst case scenario, the real time clock will drift off by 0.5 millisecond within a very short power-off time, as little as about 20 seconds. Therefore the 1-second hot start mode can only be reliably performed within 20 seconds of GPS receiver powering off time.

To overcome this shortcoming, the present invention provides a GPS receiver with extended 1-second hot start capability.

SUMMARY OF THE INVENTION

An objective of the present invention is to extend the period in which a global positioning system (GPS) receiver can be restarted achieving 1-second hot start performance without needing to modify the original architecture substantially.

To achieve the objective, the GPS receiver in accordance with the present invention shown in FIG. 1 comprises a rechargeable battery charged by the main supply voltage, a low dropout regulator (LDO) controlling power to a temperature-compensated crystal oscillator (TCXO) and a precise timing control unit, an RF chip with power-down controls, and a baseband chip with a power down timer in the same power domain as a real time clock (RTC) unit, and a timing control unit being in another independent power domain.

When the GPS receiver is turned off, only the TCXO, clock generation circuitry of the RF chip RTC unit with a power down timer, and baseband timing control block, being powered by the backup battery, are kept functional. To conserve backup battery power, all circuitry beside the ones in RTC domain is powered off when time can no longer be correctly predicted with millisecond accuracy. The power down timer is set with a timeout period equal to the worst-case interval for the TCXO to drift off by 0.5 millisecond. Timeout of the power down timer turns off the LDO, which powers the TCXO and the precise timing control unit, and the RFIC is also put in power-down mode. If the GPS receiver is restarted before time-out occurs, since time has not drifted by more than 0.5 msec, time can be correctly predicted to accuracy of 1 msec and ephemeris data stored in the backup memory can be used, thus position can be calculated immediately once 4 satellite signals are tracked, without needing to go through the process of data bit synchronization and frame synchronization to extract time.

In comparison to the conventional GPS receiver using 25 ppm 32.768 kHz crystal that may have a time drift larger than the allowable threshold value of 0.5 ms after the GPS receiver is turned off for 20 seconds, the present invention exploits the high accuracy 0.5 ppm TCXO found in modern day high sensitivity GPS receivers to extend the 1 second hot start capability. The GPS receiver of the present invention achieves 1 second hot start when the receiver is restarted within 16 minutes after turning off.

DETAILED DESCRIPTION OF THE PREFERRED EMBODIMENT

Figure 1:
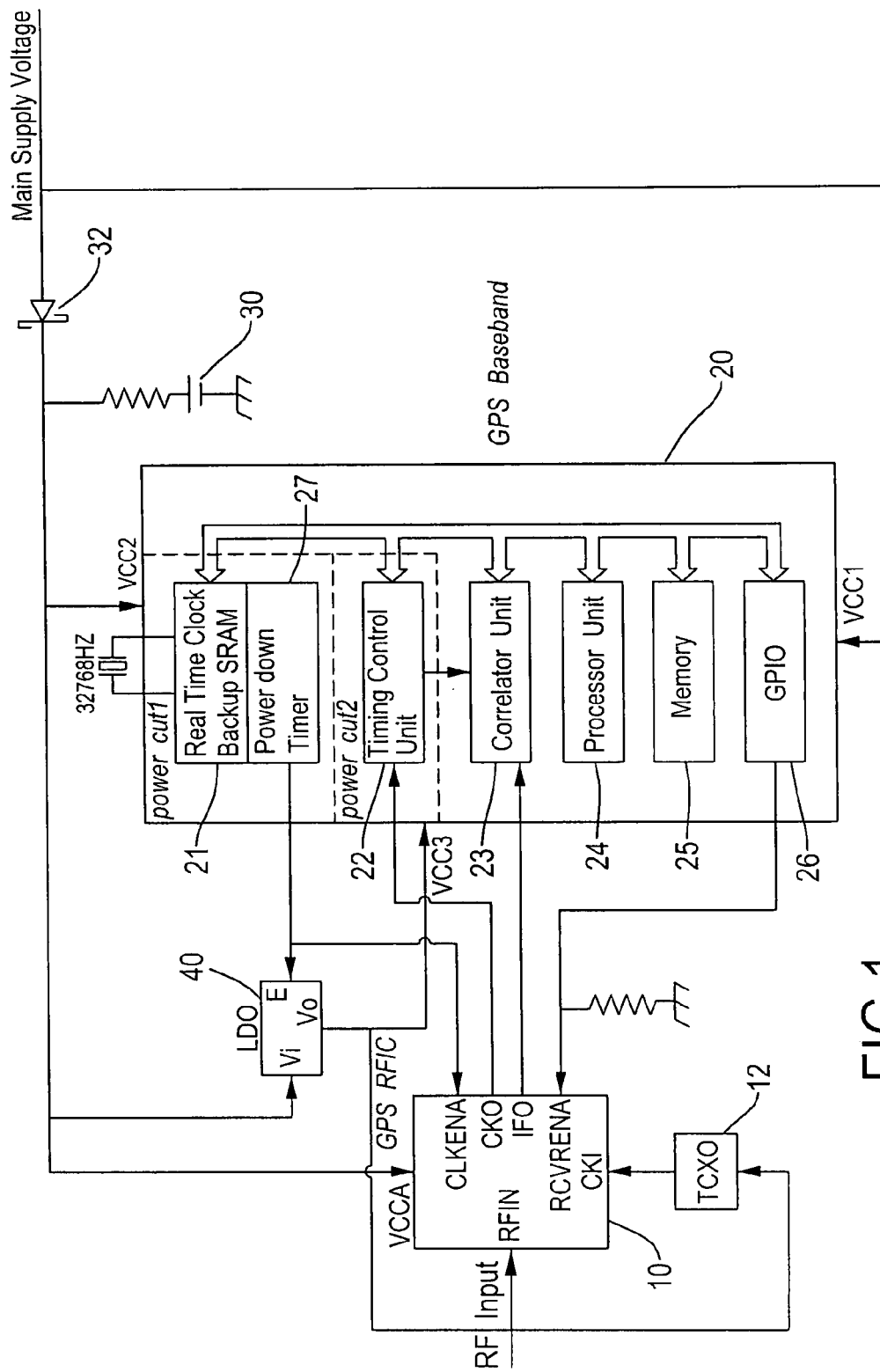
FIG. 1 is a circuit diagram of a partial circuit of a GPS receiver in accordance with the present invention.
Figure 2:
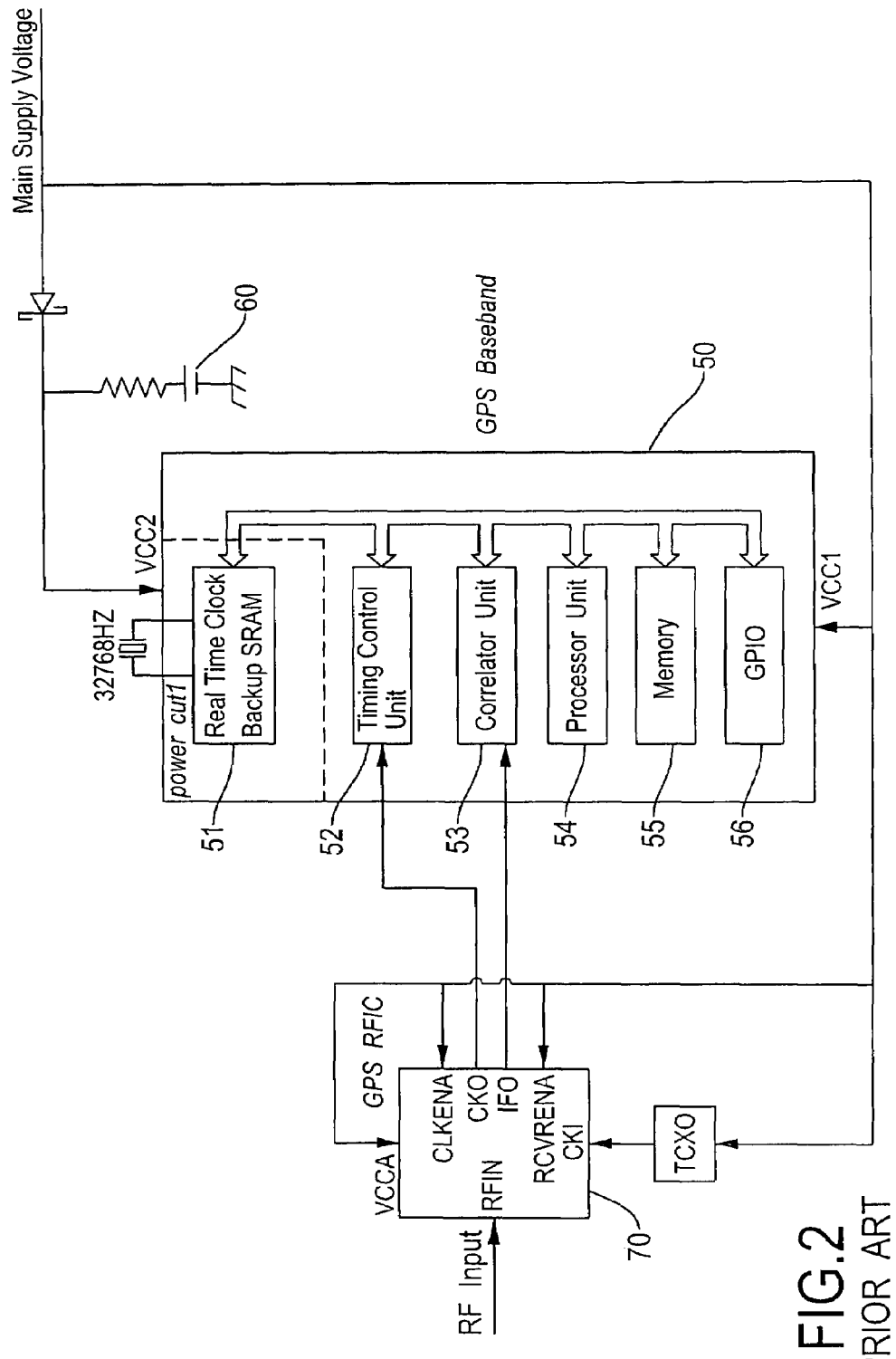
FIG. 2 is a circuit diagram of a partial circuit of a conventional GPS receiver.

With reference to FIG. 1, a GPS receiver in accordance with the present invention comprises a radio frequency (RF) chip (10), a baseband chip (20), a rechargeable backup battery (30), a low dropout regulator (LDO) (40) and a main supply voltage that charges the backup battery (30) through a Schottky diode (32).

The RF chip (10) has a clock input (CKI), a RF signal input (RFIN), an operating voltage input (VCCA), a clock enable input (CLKENA) and a receiver signal chain enable input (RCVRENA). The clock input (CKI) is connected to a temperature-compensated crystal oscillator (TCXO) (12). The RF input (RFIN) receives amplified RF signals. The operating voltage input (VCCA) connects to the battery backup battery (30). The clock enable input (CLKENA) is controlled by time-out of a power down timer (27) in the baseband chip (20).

The baseband chip (20) comprises a real time clock (RTC) unit (21), a precise timing control unit (22), a correlator unit (23), a processor unit (24), a memory (25), a general-purpose input/output (GPIO) unit (26) and the power down timer (27), and has a first voltage input (VCC1), a second voltage input (VCC2) and a third voltage input (VCC3). The first voltage input (VCC1) is connected directly to the main supply voltage. The second voltage input (VCC2) is connected directly to the battery backup battery (30). The third voltage input (VCC3) is also powered by the backup battery (30) through the LDO (40). The power down timer (27) provides a control signal to the clock enable input (CLKENA) of the RF chip (10) and an enable input (E) of the LDO (40).

The LDO (40) has a power input (Vi), a power output (Vo) and an enable input (E). The power input (Vi) connects to the backup battery (30). The power output (Vo) connects to the precise timing control unit (22) and the TCXO (12). The enable input (E) receives the control signal from the power down timer (27).

The correlator unit (23), the processor unit (24), the memory (25) and the GPIO unit (26) is in a first power domain with the first voltage input VCC1. The real time clock unit (21) and the power down timer (27) are in a second power domain with the second voltage input VCC2. The precise timing control unit (22) is in a third power domain with the third voltage input VCC3 from the LDO (40).

When the GPS receiver is turned on, the main supply voltage can charge the backup battery (30) and provide power to the RF chip (10), the baseband chip (20) and the LDO (40).

Once the GPS receiver is turned off, VCC1 provides no power to the first power domain, the receiver signal chain enable input (RCVRENA) of the RF chip (10) is being pulled-down and the signal chain of the RF chip (10) is put in a power-down mode. The backup battery (30) outputs backup power to the RF chip (10), the real time clock unit (21), the power down timer (27) and the LDO (40). When the receiver is powered off, the power down timer (27) will not be restarted every second prior to timeout. The timeout period of the power down timer (27) is determined by the smallest time for the 0.5 ppm TCXO (12) to drift off by more than 0.5 msec. During the countdown period, the LDO (40) continuously outputs power to the precise timing control unit (22) and the TCXO (12) to ensure that internal clock signals of the GPS receiver can be precisely maintained. Therefore, as long as the GPS receiver is restarted during the countdown period, before the TCXO (12) drifts off by more than 0.5 msec, the 1-second hot start can be achieved.

When the GPS receiver is powered off from the main supply voltage, the GPIO output enabling the signal chain via the RCVRENA input of the RF chip (10) is being pulled down by a resistor, making the RF chip (10) receive chain go into a sleep mode; with only the clock generation circuit functioning, drawing about 0.3 mA. It is much lower than the whole RF chip (10) working drawing about 15 mA.

The power down timer (27) is programmed to timeout with duration equal worst-case when the TCXO (12) accumulated drift is 0.5 msec. When the countdown process has ended and the GPS receiver is still turned off, the power down timer (27) outputs an inactive signal to the enable input (E) of the LDO (40) and the clock enable input (CLKENA) of the RF chip (10) to suspend operations of the TCXO (12) and a clock generator of the RF chip (10). Therefore, the backup battery (30) can retain power to maintain operation of the real time clock unit (21) for a longer time.

In conclusion, since the backup power supplied by the backup battery can provide required power to the RF chip and the precise timing control unit of the baseband chip, precise time is maintained for a longer period to ensure that the GPS receiver can be restarted with 1-second hot start performance for an extended period. As an example, the 1-second hot-start operational period is extended from the original 20 seconds to 16 minutes with 0.5 ppm TXCO; when the GPS receiver power-off time is longer than the time it takes the TCXO to introduce accumulated time-drift of 0.5 msec, the TCXO and the related clock generation circuitry and precision timing control blocks are powered-off to lengthen operation of the backup battery to maintain operation of the real-time clock and data retained in the backup SRAM. In this aspect, the present invention does not modify the original architecture of the GPS receiver substantially.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A global positioning system (GPS) receiver with extended 1-second hot start capability comprising:
   a real time clock unit, a backup SRAM and a power down timer in a first independent power domain (VCC2) within a GPS baseband chip;
   a precise timing control unit in a second independent power domain (VCC3) within the GPS baseband chip;
   a low drop regulator (LDO) controlling power supplied to a temperature-compensated crystal oscillator (TCXO) and the precise timing control unit;
   a radio frequency (RF) chip with a power down mode controlled by signals from the GPS baseband chip.

2. The GPS receiver as claimed in claim 1 wherein the GPS baseband chip further comprises:
   a correlator unit, a processor unit, a memory and a general-purpose input/output (GPIO) being in a third independent power domain (VCC1) within the GPS baseband chip distinct from the power domain of the real time clock unit, the backup SRAM and the power down timer and also distinct from the power domain of the precise timing control unit.

3. The GPS receiver as claimed in claim 2, wherein the power down timer is connected to a clock enable input of the RF chip and an enable input of the LDO.

4. The GPS receiver as claimed in claim 3, wherein the GPS receiver further comprises a rechargeable backup battery being connected to the LDO, the RF chip and the first independent power domain (VCC2).

5. The GPS receiver as claimed in claim 4, wherein the LDO has a power output being connected to the precise timing control unit and the TCXO.

6. The GPS receiver as claimed in claim 5, wherein the GPIO is connected to a receiver signal chain enable input (RCVRENA) of the RF chip.

* * * * *